United States Patent
Chou et al.

(10) Patent No.: US 8,942,455 B2
(45) Date of Patent: Jan. 27, 2015

(54) 2D/3D IMAGE REGISTRATION METHOD

(75) Inventors: Chen-Rui Chou, Raleigh, NC (US);
Atilla Peter Kiraly, Plainsboro, NJ (US); Christophe Chefd'hotel, Jersey City, NJ (US); David Thivierge-Gaulin, Redmond, WA (US)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 13/597,963

(22) Filed: Aug. 29, 2012

(65) Prior Publication Data

US 2013/0070995 A1   Mar. 21, 2013

Related U.S. Application Data

(60) Provisional application No. 61/528,834, filed on Aug. 30, 2011, provisional application No. 61/585,690, filed on Jan. 12, 2012.

(51) Int. Cl.
*G06T 7/00* (2006.01)

(52) U.S. Cl.
CPC ........ *G06T 7/0032* (2013.01); *G06K 2209/057* (2013.01); *G06T 2200/04* (2013.01); *G06T 2207/10081* (2013.01); *G06T 2207/10088* (2013.01); *G06T 2207/10121* (2013.01); *G06T 2207/10124* (2013.01); *G06T 2207/30048* (2013.01)
USPC .......................................... 382/131; 382/294

(58) Field of Classification Search
None
See application file for complete search history.

(56) References Cited

U.S. PATENT DOCUMENTS

| | | | |
|---|---|---|---|
| 2006/0269164 A1* | 11/2006 | Viswanathan | 382/293 |
| 2007/0238959 A1* | 10/2007 | John et al. | 600/407 |
| 2009/0290771 A1* | 11/2009 | Frank et al. | 382/128 |
| 2011/0152676 A1* | 6/2011 | Groszmann et al. | 600/426 |
| 2012/0069017 A1* | 3/2012 | Zheng et al. | 345/420 |

OTHER PUBLICATIONS

Sadowsky et al. "Rendering Tetrahedral Meshes with Higher-Order Attenuation Functions for Digital Radiograph Reconstruction." IEEE Visualization 2005, VIS 05, Oct. 2005, pp. 303-310.*
Xu et al. "Single-View 2D-3D Registration for X-Ray Guided Bronchoscopy." IEEE International Symposium on Biomedical Imaging: From Nano to Macro, Apr. 14, 2010, pp. 233-236.*
T.F. Chan and L.A. Vese, "Active contours without edges," IEEE Transactions on Image Processing, Feb. 2001, pp. 266-277, vol. 10, No. 2.
J.A. Nelder and R. Mead, "A simplex method for function minimization", Computer Journal, 1965, pp. 308-313, vol. 7.
M. Jenkinson and S. Smith, "A global optimisation method for robust affine registration of brain images," Medical Image Analysis, 2001, pp. 143-156, vol. 5, No. 2.
E. Van De Kraats, G. Penney, D. Tomazevic, T. Van Walsum, and W. Niessen, "Standardized evaluation methodology for 2D-3D registration," Medical Imaging, IEEE Transactions, Sep. 2005, pp. 1177-1189, vol. 24.
E. J. Hemminger, M.J. Girsky, and M.J. Budoff, "Applications of computed tomography in clinical cardiac electrophysiology," Journal of Cardiovascular Computed Tomography, 2007, pp. 131-142, vol. 1, No. 3.

* cited by examiner

Primary Examiner — Jon Chang

(57) ABSTRACT

A method (100) that registers a 3D heart volume (112, 114) obtained from either a pre-operative MR image or CT image (102) to an intra-operative fluoroscopic image using a mesh of the heart structure (106) as the basis for the registration.

25 Claims, 8 Drawing Sheets

2D/3D IMAGE REGISTRATION METHOD

CROSS-REFERENCE TO RELATED APPLICATIONS

This application claims the benefit of both Provisional U.S. Patent Application Ser. No. 61/528,834, entitled, "Novel Multi-modal 2D/3D Registration Method for Fluoro Data", filed in the name of Chen-Rui Chou, Atilla Peter Kiraly, and Christophe Chefd'hotel, on Aug. 30, 2011, and Provisional U.S. Patent Application Ser. No. 61/585,690, entitled, "3D-2D Mesh-Based Registration", filed in the name of David Thivierge-Gaulin, Atilla Peter Kiraly, Christophe Chefd'hotel, and Chen-Rui Chou, on Jan. 12, 2012, the disclosure of each is also hereby incorporated herein by reference.

FIELD OF THE INVENTION

This invention generally relates to image processing and, more particularly to, the alignment or registration of different images.

BACKGROUND OF THE INVENTION

Cardiac electrophysiology (EP) studies that are used to diagnose and treat heart arrhythmia are conducted using catheters in minimally invasive medical procedures. Specifically, the studies involve the placement of a catheter through a patient's blood vessels to reach the heart for testing and treatment of the heart. Catheters are medical devices in the form of hollow flexible tubes for insertion into a part of the body usually to permit the passage of fluids or keep open a passageway. A catheter is normally accompanied with accessory components such as a control handle, catheter tips, surgical tools, etc., depending upon the application (and thus as a whole may be referred to, more properly, as a catheter system).

In minimally invasive medical procedures, catheters are often used to deliver therapy in such a way that requires a respective catheter tip to be in contact with the tissue being treated. Radio frequency ablation (RFA) is one example of such a procedure, wherein the therapy is carried out with an ablation catheter having a tip that delivers high frequency alternating current so as to cause heating of the tissue. In the case of an RFA procedure to carry out treatment during an EP study, electrodes on a catheter tip are used to ablate specific sections of, for example, the pulmonary veins. The goal is to have the RFA heat the tissue to the point of causing lesions that will block certain electrical pathways in the heart tissue that are contributing to the arrhythmia.

RFA procedures and other minimally invasive medical procedures are routinely performed under image guidance. For example, bi-plane and monoplane x-ray fluoroscopy (fluoro) images are typically used to give the physician or health professional valuable real-time feedback during a respective procedure. FIG. 1a shows a typical real-time fluoro image used in an EP study with two electrode catheters 2, 4 inserted into the heart of a patient. The darker shaded region 6 in the middle of the image shows the contour of the heart. While image guidance systems and techniques can provide visualization of the catheter tip, and sometimes localization of the tip within some coordinate space, the challenge is often in relating that tip information to the actual location of the anatomy of interest. Sometimes this might be accomplished by using optimal imaging planes that clearly show both the anatomy and the device, although this can be difficult in a complex anatomy such as the heart. In the case of the heart, this is further complicated by the heart beating motion, patient breathing motion and catheter motion. A lasso catheter 8, shown in FIG. 1a, can be placed on, for example, the pulmonary vein to assist in guidance during a procedure. However, this catheter 8 is not always available during different types of clinical procedures.

Other techniques involve the use of pre-acquired volumetric imaging data or 3D models of the anatomy superimposed with the real-time imaging. Recently, a EP-Suite software package from Siemens was introduced that allows for multimodal preoperational (pre-op) 3D images of the patient to be annotated and overlaid upon the live fluoro images (acquired, for example, from either computed tomography (CT) or magnetic resonance (MR) imaging modalities). These images can help physicians and other health professionals better locate the correct region to ablate. A necessary portion of the workflow is the requirement to manually align a previously created mesh of, for example, the heart in the pre-op 3D image to the fluoro images. Automation of this registration step would result in a faster and simplified workflow.

The automatic registration of the heart or other structures of the body, to fluoro data, however, can be very challenging due to the low contrast of most tissues in fluoro images and possibly the missing-angle projection geometry (e.g., bi-plane geometry) used in clinical settings. Currently, there is no automatic method available to 1) correct the patient's setup error between the pre-op 3D image (e.g., CT or MR image) and the ob-board fluoroscopy or 2) track the intra-treatment heart, for example, position under respiratory motion. Moreover, registrations between pre-op MR images and fluoroscopic images present additional difficulties due to the substantial imaging gap between two different modalities (MR and X-ray). For example, when generating DRRs (Digitally Reconstructed Radiographs) from an MR image to perform a registration with the fluoro images, there is no density information available to allow the generation of a realistic X-ray image.

FIG. 1b shows an example of a substantial initial set-up error between a pre-op 3D image and the real-time fluoroscopy image of FIG. 1a. The overlay image 10 is a DRR generated from the segmented heart volume of a pre-op MR image. The shading of the overlay 10 shows the depth of the heart along the plane's normal direction.

Thus, there is a need to improve image guidance systems and techniques for visualization and localization of catheters and other tools/objects relative to the anatomy of interest of a patient during medical procedures.

SUMMARY OF THE INVENTION

An embodiment of the present invention obviates the above problems by providing a method of registering a 2D image of an object to a 3D image of the object, comprising forming a 3D mesh of the object from the 3D image, translating the 3D image or the 3D mesh into a counterpart 2D image, and spatially aligning the 3D mesh with the 2D image using the counterpart 2D image. The translating step may comprise projecting the 3D mesh into two dimensions to obtain a 2D mask. The spatially aligning step may comprise optimizing a pose of the 3D mesh within the 2D image using the counterpart 2D image. The translating and spatially aligning steps may be iteratively performed so that an alignment distance between the 2D image and the 3D mesh reaches a predetermined amount. Alternatively, the spatially aligning step may comprise applying a cost function to evaluate and optimize a Chan-Vese-like functional used as an image dissimilarity metric. In such case, the spatially aligning step may further comprise minimizing the image dissimilarity metric using a Downhill Simplex optimization method. The method may further comprise obtaining a plurality of image frames for the 2D image and determining the optimal image frame for an initial spatial alignment of the 3D mesh with the 2D image.

An embodiment of the present invention may also provide a method of visualizing an object relative to an anatomical region of interest of a patient during a medical procedure, comprising obtaining an intra-operative 2D image of the anatomical region of interest; obtaining volumetric imaging data of the anatomical region of interest; obtaining a 3D mesh of the volumetric imaging data; obtaining an estimated pose of the anatomical region of interest from the 3D mesh; and optimizing the estimated pose of the 3D mesh within the intra-operative 2D image to register the 3D mesh with the intra-operative 2D image and to localize the object relative to the anatomical region of interest. Obtaining volumetric imaging data may comprise acquiring 3D images of the anatomical region of interest using either CT or MR imaging. Obtaining a 3D mesh may comprise segmenting the volume of the anatomical region of interest. Obtaining an estimated pose may comprise computing and rendering a 2D mask from the 3D mesh. In such case, the optimizing step may comprise updating the estimated pose of the 3D mesh within the intra-operative 2D image using the 2D mask. The optimizing step may further comprise calculating the distance between the intra-operative 2D image and the 2D mask. Alternatively, the optimizing step may comprise applying a cost function to evaluate and optimize a Chan-Vese-like functional used as an image dissimilarity metric. In such case, the optimizing step may further comprise minimizing the image dissimilarity metric using a Downhill Simplex optimization method. Alternatively, the optimizing step may comprise applying a cost function to evaluate and optimize an image dissimilarity metric that has the form of:

$$F = \left[ \int_{x \in \Omega(P(V))} \left( I(x) - \frac{1}{\int_{y \in \Omega(P(V))} 1 \cdot dy} \int_{y \in \Omega(P(V))} I(y) dy \right)^2 dx \right] + \left[ \int_{x \notin \Omega(P(V))} \left( I(x) - \frac{1}{\int_{y \notin \Omega(P(V))} 1 \cdot dy} \int_{y \notin \Omega(P(V))} I(y) dy \right)^2 dx \right],$$

where I is a respective intra-operative 2D image, $\Omega$ specifies the non-zero region in the intra-operative 2D image, P is the re-projection operator/DRR generator for the 2D mask, and V is the volume of the anatomical region of interest in the respective volumetric imaging data. In such case, the optimizing step may comprise minimizing the image dissimilarity metric using a Downhill Simplex optimization method. Obtaining an estimated pose and the optimizing step may be iteratively performed so that an alignment distance between the intra-operative 2D image and the 2D mask reaches a predetermined amount.

Obtaining an estimated pose may alternatively comprise projecting the 3D mesh so as to render the 3D mesh in two dimensions. In such case, projecting may comprise applying a geometric transform on the 3D mesh. Also, the optimizing step may comprise comparing the positional difference between the rendering of the projection of the 3D mesh and the intra-operative 2D image, which are overlaid one another. Comparing may then comprise applying a cost function to evaluate and optimize an image dissimilarity measure for finding a pose that registers the 3D mesh with the 2D image.

The method may further comprise obtaining a plurality of image frames for the intra-operative 2D image and determining an optimal image frame for an initial alignment of the 3D mesh with the intra-operative 2D image. As an alternative, the method may further comprise obtaining a plurality of image frames for the intra-operative 2D image and detecting changes in the average intensity of the image in the plurality of image frames to determine an optimal image frame for an initial alignment of the 3D mesh with the intra-operative 2D image. Also, obtaining an intra-operative 2D image of the anatomical region of interest may comprise obtaining an intra-operative 2D image of the anatomical region of interest that is enhanced by an imaging contrast agent received by the patient.

An embodiment of the present invention may also provide a system for providing multi-modal 2D/3D image registration during a medical procedure, comprising an imager that acquires 2D image data of an anatomical region of a patient and a processor that manipulates the acquired image data and stored 3D image data of the anatomical region to align a stored 3D image to a 2D image and to automatically track the anatomical region position during the medical procedure, said processor manipulating the 3D image data, in part, to render the stored 3D image in two dimensions for a positional comparison between the 3D image and the 2D image. The processor may have a graphics processing element that accelerates the manipulation of the 3D image data to render the stored 3D image in two dimensions. The processor may apply a cost function to evaluate and optimize a Chan-Vese-like functional used as an image dissimilarity metric and an optimization method to minimize the image dissimilarity metric.

BRIEF DESCRIPTION OF THE DRAWINGS

For a better understanding of the present invention, reference is made to the following description of exemplary embodiments thereof, and to the accompanying drawings, wherein.

DETAILED DESCRIPTION

Figure 2:
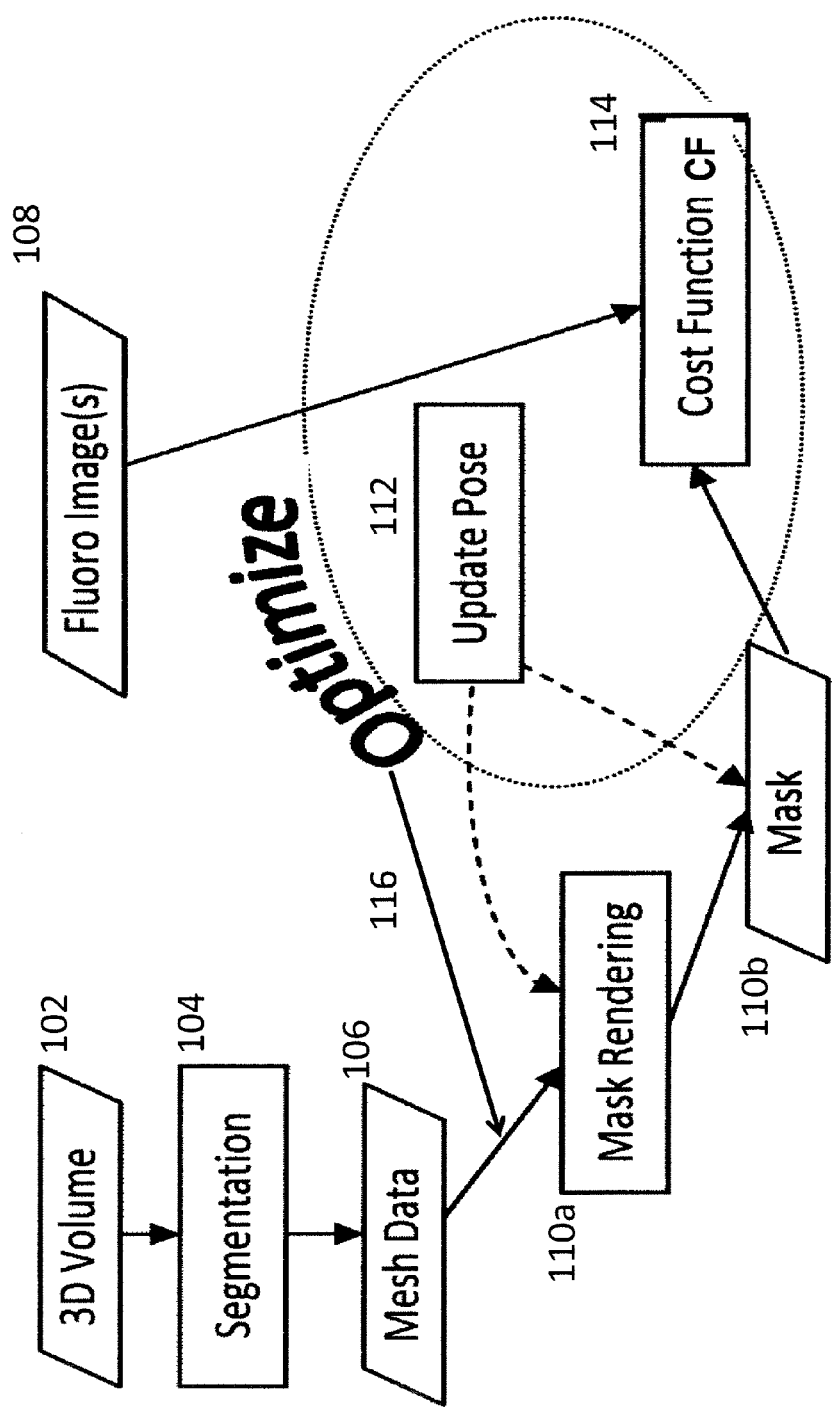
FIG. 2 is a schematic view of a method carried out in accordance with an embodiment of the present invention.

FIG. 2 is a schematic view of a method 100 carried out in accordance with an embodiment of the present invention. Generally, volumetric imaging data of the patient and, more particularly, of the anatomical region of interest (for example, the heart) is acquired (Step 102). Normally, this 3D data is acquired prior to the medical procedure to be performed and, as noted above, the data may be acquired using CT or MR imaging. As an alternative, the data may be obtained from a 3D model of the anatomical region of interest. The method 100 performs automatic or manual segmentation of the 3D volume (Step 104) and obtains a 3D mesh from the pre-acquired 3D volume (Step 106). A 3D mesh is a 3D object representation consisting of a collection of vertices and polygons that define the shape of an object in 3D. This 3D mesh is then used as a basis for registration with real-time fluoro data, which is acquired during the medical procedure (Step 108).

Specifically, the method 100 computes and renders a 2D mask from the 3D mesh (Step 110a) which provides an initial or estimated pose of the anatomical region of interest (Step 110b). The 2D mask is a delineation of a projection of the 3D mesh that segments the anatomical region of interest from the remainder of the 3D mesh image. This is described in more detail below. The method 100 uses the 2D mask to update/optimize the pose (i.e., the relative position and orientation) of the 3D mesh within the real-time fluoro images (Step 112). Using an image dissimilarity (or similarity) measure/metric, the method 100 calculates the distance between the real-time, intraoperative fluoroscopic image and the 2D mask and applies a cost function CF to evaluate and optimize the dissimilarity measure for finding the pose that registers the 3D mesh with the 2D fluoro image (Step 114). The cost function CF may have an associated optimizer algorithm to assist in minimizing the cost function/metric and finding a solution for the cost function that registers the imaging data. The image dissimilarity metric, the cost function, and the optimizer algorithm are described in more detail below. The method 100 may be an iterative process to continually render a 2D mask (Step 116) to guide the pose changes so that the distance between the real-time, intraoperative fluoroscopic images and the 2D masks becomes a minimal amount, as desired or as required. In this way, the method 100 provides automatic 2D/3D registration. Note that, with small changes, the 2D mask re-rendering (Step 116) may not be desired or necessary and the previous mask can be used, as shown in the dashed lines of the figure.

The method 100 may use a novel image dissimilarity metric using a Chan-Vese-like functional in the optimization of the registration, which is not known to have been previously used for this purpose. Further, the method 100 may, for example, use the Downhill Simplex optimizer (also known as the Amoeba optimizer) method for the metric. The Chan-Vese functional is described in more detail in an article by T. F. Chan and L. A. Vese, entitled "Active contours without edges," IEEE Transactions on Image Processing, February 2001, pp. 266-277, Vol. 10, No. 2 and the Downhill Simplex optimizer is described in more detail in an article by J. A. Neider and R. Mead, entitled "A simplex method for function minimization", Computer Journal, 1965, pp. 308-313, Vol. 7, each article being incorporated herein by reference.

The Chan-Vese-like image dissimilarity metric may take on the following general form for the method 100:

$$F = \left[\int_{x \in \Omega(P(V))} \left(I(x) - \frac{1}{\int_{y \in \Omega(P(V))} 1 \cdot dy} \int_{y \in \Omega(P(V))} I(y) dy\right)^2 dx\right] +$$

-continued $$\left[\int_{x \notin \Omega(P(V))} \left(I(x) - \frac{1}{\int_{y \notin \Omega(P(V))} 1 \cdot dy} \int_{y \notin \Omega(P(V))} I(y) dy\right)^2 dx\right],$$

where I is a respective fluoro image, $\Omega$ specifies the non-zero region in the fluoro image, P is the re-projection operator/DRR generator, and V is the heart volume in the respective pre-op 3D image. The functional F calculates the sum of variances inside and outside the implied heart region in the DRR generated by the pre-op 3D image with current estimated translations. In this case, the re-projection of the mesh results (i.e., the mesh is rendered in 2 dimensions) is a binary mask.

The above form of the metric described is nearly convex and therefore any optimizer should be able to converge it to the global minimum. As noted above, the method 100 may use the iterative Downhill Simplex optimizer, i.e., Amoeba optimizer, algorithm to minimize the image dissimilarity metric functional F. Advantageously, this derivative-free optimizer bypasses the noisy functional gradients and can converge the functional F to the global minimum.

Also, as noted above, the method 100 obtains the initial 3D mesh via segmentation of the original, pre-acquired 3D volume (Steps 104 and 106). This can be done either manually or automatically using existing approaches. Once the 3D mesh is obtained, the 3D mesh is re-projected (i.e., rendered in 2 dimensions) (Steps 110a and 110b) and used as a basis for registration. In a real-time case of obtaining the image data, successive fluoro images (in a sequence of images) may result in only minor changes. In these cases, registration would be close to the optimal solution quickly and the 2D mask's new position (in a re-rendering) may only result in very similar appearance for the registration as in the previous solution. These properties can be used to allow for a true, real-time 2D/3D registration. Additionally, re-rendering the 2D mask within the GPU (i.e., graphics processing unit) of the associated imaging system can also greatly reduce the computation time of computing a new 2D mask for the cost function used in an optimization.

As part of pre-processing the image data, the method 100 may utilize several approaches in identifying image frames that may be more optimal for registration. For example, given several frames, the optimal image frame for registration can be automatically determined by calculating the intensity of the image about specific regions (mainly central regions) in the group of frames and detecting large drops in the average intensity of the image about the specific regions.

Figure 3:
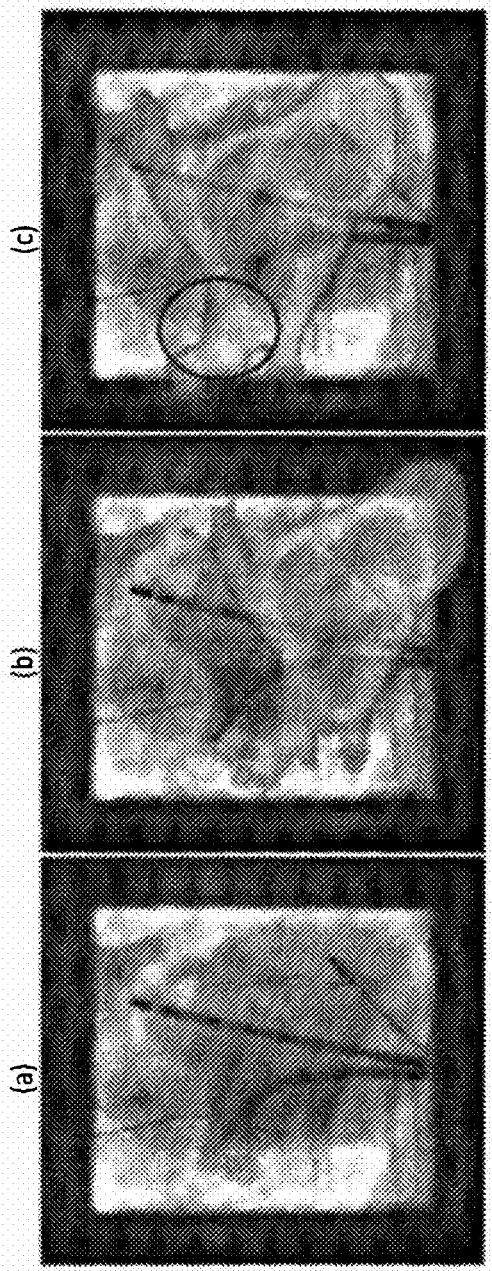
FIGS. 3a-3c are fluoroscopy images of a heart after a contrast agent is injected into a patient showing actual registration results using the method of FIG. 2.
Figure 4:
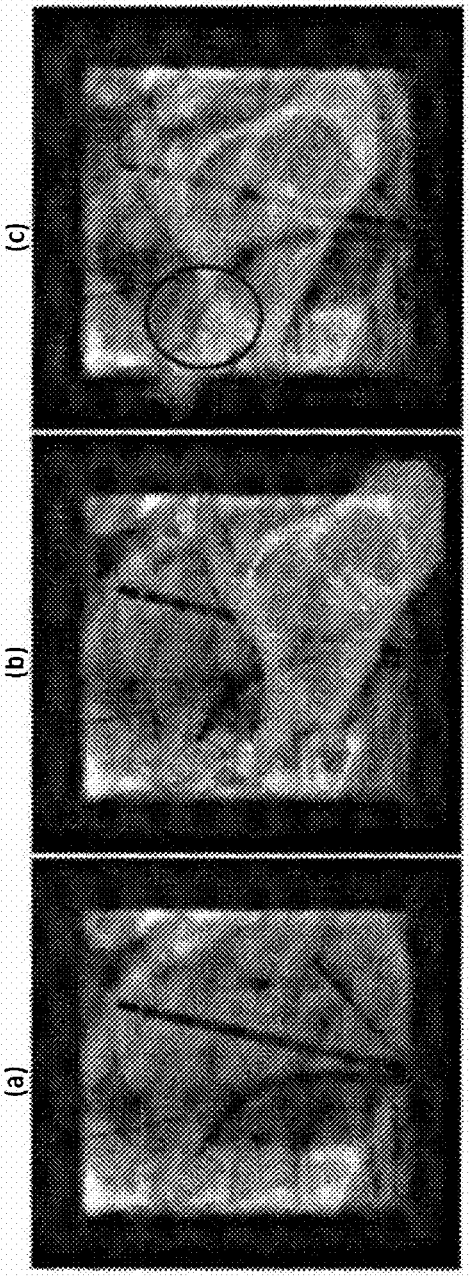
FIGS. 4a-4c are fluoroscopy images of a heart before a contrast agent is injected into a patient showing actual registration results using the method of FIG. 2.
Figure 5:
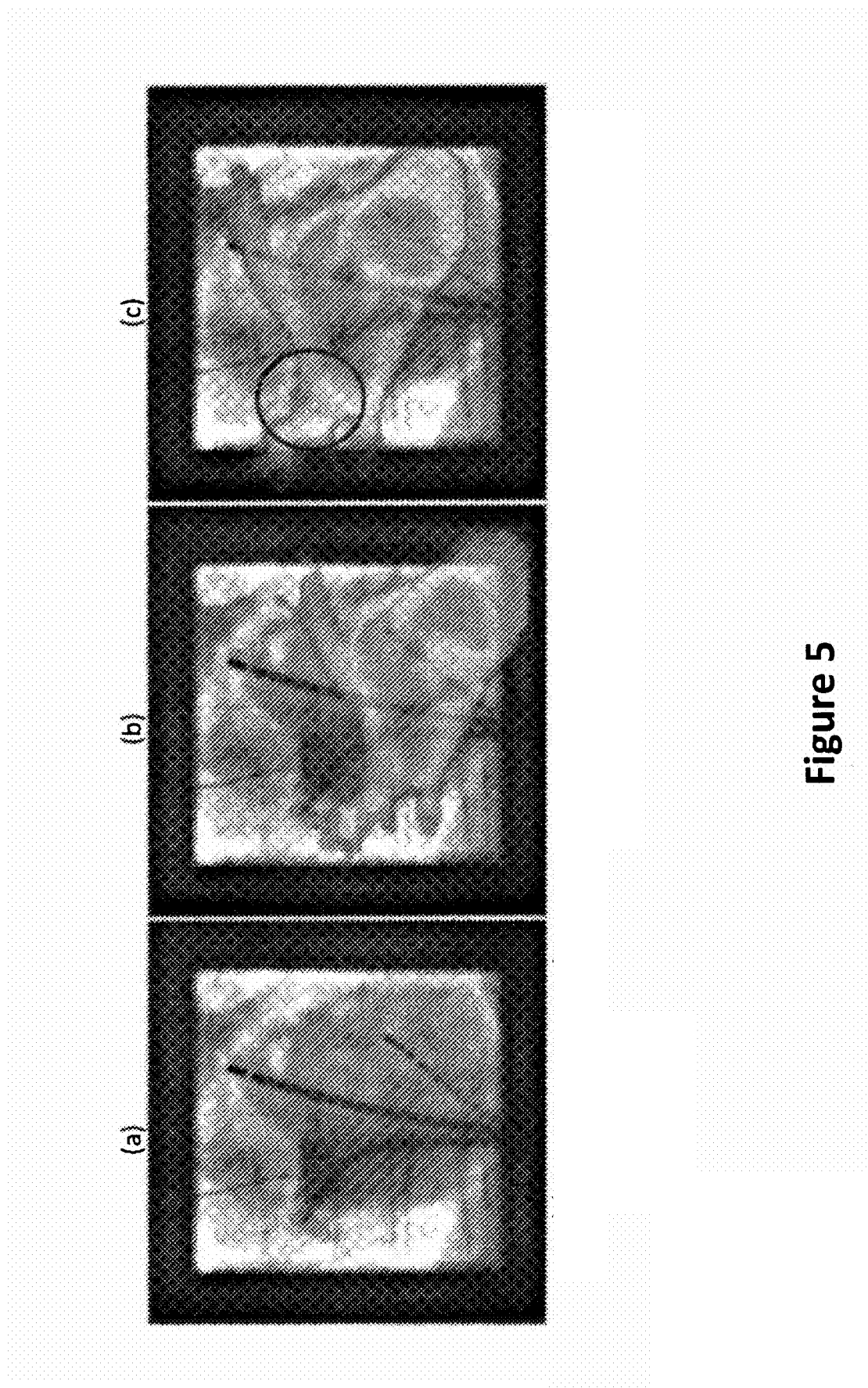
FIGS. 5a-5c are fluoroscopy images of a heart during a contrast agent being injected into a patient showing actual registration results using the method of FIG. 2.

Also, during imaging for heart procedures, a contrast agent is often injected into the patient that highlights vessels and chambers of the heart in acquired images. Such a contrast-enhanced image frame may be more optimal for registration under the method 100 since the outline can result in a better discrimination of the structures of interest. However, the method 100 provides similar registration results if a contrast agent is utilized in the imaging or if no contrast is utilized (and the registration is then driven by the catheter-implied heart shapes). This is illustrated in FIGS. 3, 4 and 5, each showing actual imaging and registration results using the method 100. FIG. 3a is a raw monoplane fluoro image after the injection of an appropriate contrast agent. FIG. 3b shows the fluoro image of FIG. 3b with an overlay of the heart contour (shaded) generated from the initial, pre-acquired 3D image and FIG. 3c shows the fluoro image of FIG. 3a with an overlay of the heart contour (shaded) generated from the registered 3D image.

The method 100 performed registration in 78 iterations. FIG. 4a is a raw monoplane fluoro image before the injection of a contrast agent. FIG. 4b shows the fluoro image of FIG. 4a with an overlay of the heart contour (shaded) generated from the initial, pre-acquired 3D image and FIG. 4c shows the fluoro image of FIG. 4a with an overlay of the heart contour (shaded) generated from the registered 3D image. The method 100 performed registration in 96 iterations.

As a further comparison, FIGS. 5a-5c show actual imaging and registration results using the method 100 in which an amount of contrast agent is utilized in the imaging that is between the amounts used in the imaging of FIGS. 3a-3c and FIGS. 4a-4c. FIG. 5a is a raw monoplane fluoro image during the injection of the respective appropriate contrast agent. FIG. 5b shows the fluoro image of FIG. 5a with an overlay of the heart contour (shaded) generated from the initial, pre-acquired 3D image and FIG. 5c shows the fluoro image of FIG. 5a with an overlay of the heart contour (shaded) generated from the registered 3D image. The method 100 performed registration in 82 iterations.

The figures show similar registration results regardless of the amount of contrast used in imaging. This suggests that the method 100 does not require the injection of contrast agents. But it is noted that using the most contrast-enhanced fluoro images (i.e., FIGS. 3a-3c) assists the method 100 to yield more accurate results and to utilize shorter registration iterations. This is evidenced by the relative positions of the pulmonary veins in the estimated heart and the lasso catheters that are circled in the raw fluoro images in FIGS. 3c, 4c and 5c.

Advantageously, the presence of a catheter in the heart also inherently assists the registration since the catheter provides a change of the standard deviation and mean within the mask region, which in turn changes the cost function CF. This change allows for the registration to be obtained even with weak contrast within the heart.

The method 100 has been shown to achieve actual 2D/3D registration results in 25 seconds. This time can be reduced by further optimizations, for example, GPU acceleration for the DRR generator. It is expected that this time can be substantially reduced to have more than 400 times acceleration after GPU acceleration, which allows the method 100 to converge within 100 ms. Therefore, the method 100 has potential to support real-time heart tracking during the EP procedure. Additionally, as stated before, the solution would be close to the optimal solution in the event of small changes, allowing for an even faster convergence by the respective optimizer.

Importantly, the method 100 may be performed with or without the prohibitive computation cost of producing a DRR. The classic 2D/3D registration method is to cast the 3D image into a DRR, which is in turn compared to the 2D image. The problem with this classic approach is that the generation of DRR images, which has to be updated for every transform to explore in the optimization process, is computationally expensive. Registration using the method 100 may be driven solely by the different grouping of pixels created by the projection of the 3D mesh (resulting in a 2D mask) and, thus may achieve much greater registration speed than if dealing directly with 3D volumetric data.

Figure 1:
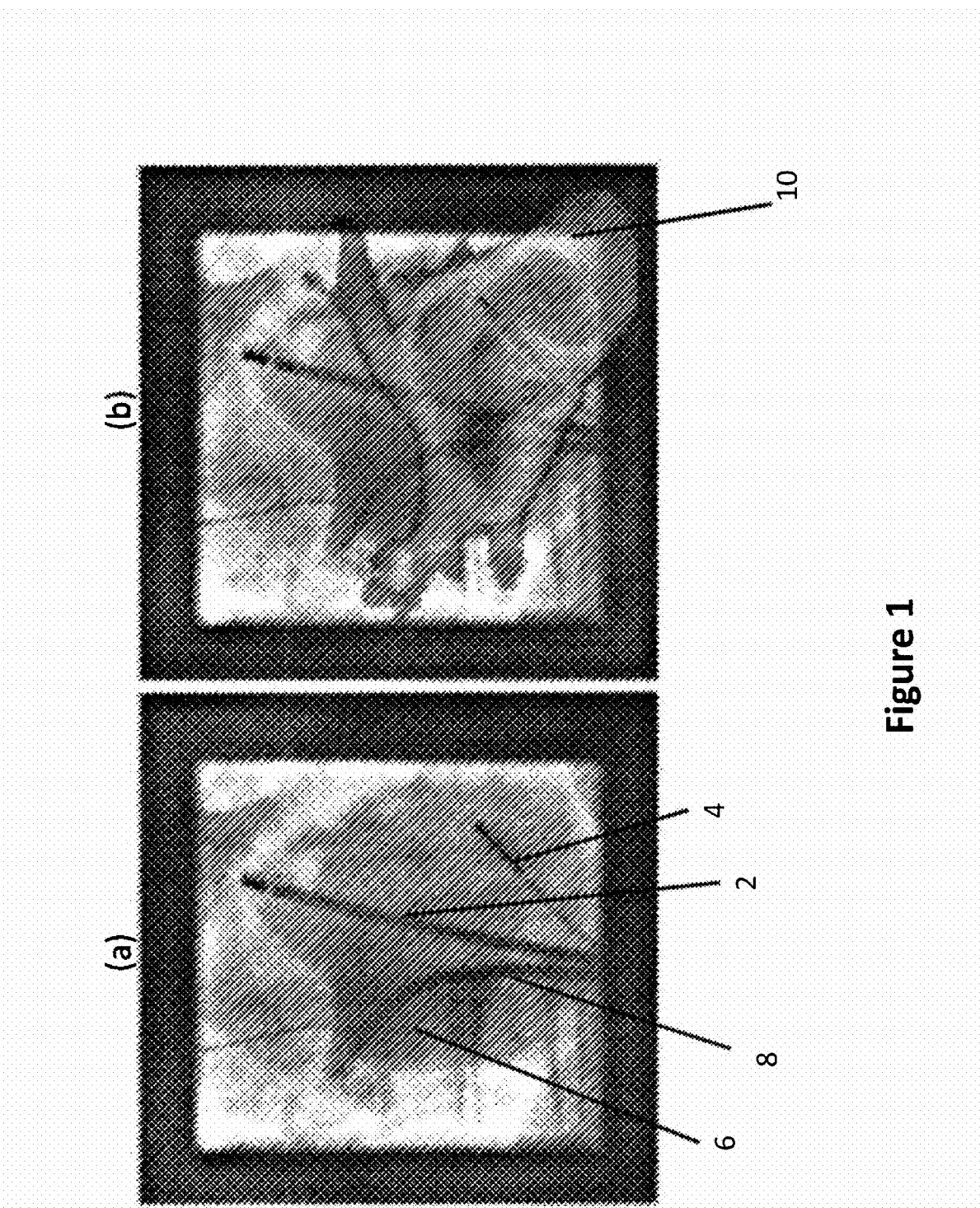
FIG. 1a is a typical fluoroscopy image used in an EP study.
FIG. 1b is the fluoroscopy image of FIG. 1a with an overlay of a DRR of a pre-op 3D image.
Figure 6:
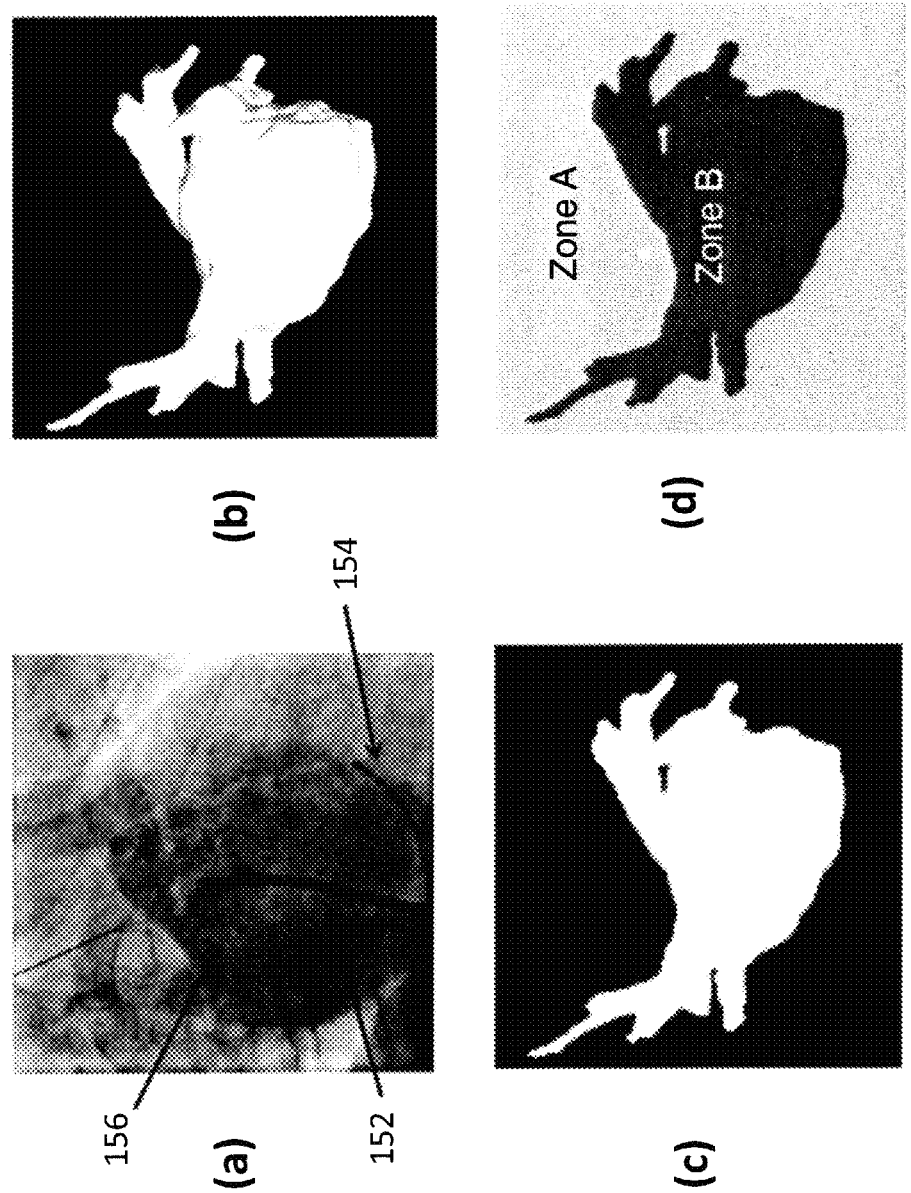
FIGS. 6a-6d are images resulting from performing the method of FIG. 2.

FIGS. 6a-6d illustrate some of the resulting images in performing the method 100. Like FIG. 1a, FIG. 6a shows a typical real-time 2D image (fluoro image) with two electrode catheters 152, 154 inserted into the heart 156 of a patient. FIG. 6b shows a 3D mesh segmented from 3D MR imaging data. FIG. 6c shows the delineation of the mesh of FIG. 6b into a mask, creating a bisection of the image (shown as dark and light zones). FIG. 6d shows the result of the averaging of the pixels under the zones (Zones A and B) created by the mask of FIG. 6c.

The method 100 may use principles of active contour models to drive a registration without having to compute a DRR. For example, the above-referenced Chan and Vese article that relates to active contours describes segmenting an image based on the minimization of an energy function. So, assuming that the zones delimited by the 3D mesh of the method 100 are formed of "similar" pixels, the method 100 may then derive a cost function CF whose minimum coincides with the position of the registered mesh in 3D space.

Also, the typical approach of active contours evolve a curve by iteratively moving control points of the curve while keeping the position set that minimizes the cost. With mesh registration under the method 100, instead of freely evolving the curve, evolving a curve is constrained by the mesh's projection. This projection may be obtained by the application of a geometric transform (either translation or translation and rotation transformations may be used) on the mesh. Thus, instead of moving the control points of a curve, the N-dimension parameter space of the transform is modified, which in turn modifies the "zone delimitation" curve (i.e., the 2D or binary mask).

The "zone delimitation" curve created by the projection of the mesh may be then positioned over the 2D image where the partition of the image correctly segments the region to be registered. In order to achieve this, the method 100 derives a cost that is minimum or low when the mask is overlaid over the target structure in the 2D image and that is maximum or high when the mask is overlaid over any other image region. If one assumes that the target structure in the 2D image is relatively homogeneous and markedly different from the other zones of the 2D image, the method 100 may utilize a simple comparison of the average pixel values that fall under and outside the mask as a good indication of the fitness of the position. In this way, the method 100 may define and use the following cost function:

$$CostFn := \sum_{\forall (x,y) \in mask} (im2D(x, y) - \text{average}_{\in mask})^2 + \sum_{\forall (x,y) \notin mask} (im2D(x, y) - \text{average}_{\notin mask})^2$$

Further, the solution to the application of the cost function, and any associated optimizer, can be stated as the minimization of the cost function, as follows.

$$\hat{T}_n = \underset{T_n}{\text{argmin }} CostFn(im2D, MaskProjection(T_n(\text{mesh})))$$

The solution of the registration is the transform T. Since it would be prohibitively time consuming to explore the entire domain of the solution set, the method 100 may use an optimizer algorithm to attempt to find the global minima over the 3-dimension parameter set $(T_x, T_y, T_z)$ (for translation transformations) or the 6-dimension parameter set $(T_x, T_y, T_z, R_x, R_y, R_z)$ (for translation and rotation transformations). For example, the Amoeba optimizer or the Powell optimizer may be used to register the data and a 'limited resolution-range' global search optimizer may be used to find a good starting or initial position, if required or if desired.

It is noted that the registration, using the above described cost function, can be seen as a sub-case of a generic optimization problem:

$$CostFn(x), x \in \mathbb{R}^n$$

The parameters x in the N-dimension parameter space that minimize a given cost function are the parameters of the transformation that register the mesh.

The following generally describes the generation of a projection of the 3D mesh. In order to render the 3D mesh to a 2D mask, the method 100 defines the geometry of the system by specifying how 3D points are projected on the 2D image plane (a projection matrix), where the 2D image plane is situated in the 3D world (view matrix) and what transformation is applied to the mesh (a transformation matrix). This becomes especially important when working with biplane data because of the link created between a transform of the 3D mesh on the 2D planes. The following equation generally shows how a point in world coordinate (i.e., 3D world) is transformed to a point on a 2D image:

$$Pt^{2d\text{-}homogeneous} = \begin{bmatrix} x \\ y \\ z \\ w \end{bmatrix}_{homogeneous} = M_{proj} \cdot M_{view} \cdot M_{model} \cdot \begin{bmatrix} x \\ y \\ z \\ 1 \end{bmatrix}_{world}$$

This is the known process that is used to transform the 3D mesh into the binary mask. The projected point needs to be transformed from a homogeneous coordinate to an image coordinate. This is done by dropping the z-value and dividing by the w-component:

$$Pt^{normalized\text{-}device\text{-}2d} = \begin{bmatrix} Pt_x^{2d\text{-}homogeneous} / Pt_w^{2d\text{-}homogeneous} \\ Pt_y^{2d\text{-}homogeneous} / Pt_w^{2d\text{-}homogeneous} \end{bmatrix}$$

Using a 'typical' model view matrix, the normalized device coordinates can be clipped at [−1.0 . . . 1.0], which can then be rendered directly to a screen of size $im_x \times im_y$ by using the following equation:

$$Pt^{2d\text{-}image} = \begin{bmatrix} \dfrac{im_x \cdot (Pt_x^{normalized\text{-}device\text{-}2d} + 2)}{4} \\ \dfrac{im_y \cdot (Pt_y^{normalized\text{-}device\text{-}2d} + 2)}{4} \end{bmatrix}$$

The biplane geometry is set by specifying the components of the first equation for each view. The parameter $M_{model}$ is set to the identity matrix because the position of the 3D mesh in space is assumed to be stored in the mesh file. The parameters $M_{proj}$ and $M_{view}$ are set depending on the system geometry.

It is understood that the method 100 may perform pre-processing of the 3D image data in order to have a better initial correlation with the target structure in the 2D fluoro images and, otherwise, simplify the registration process. For example, before or after obtaining the 3D mesh, the method 100 may reduce the target structure by cutting, removing, or using some other operation. Thus, the method 100 may cut the pulmonary veins which are attached to the left atrium in a 3D image which are not easily visible in the 2D fluoro images.

Further pre-processing may done, as noted above, by identifying image frames that may be more optimal for registration. The following describes an experiment conducted to identify image frames that may be more optimal for registration using the method 100. The source data of 2D fluoro images (also known as a fluoro video) comes as a DICOM series of between 15 and 40 frames. The series usually shows the injection of contrast agent in the left atrium of the patient heart. The left atrium is only (partially) visible on some of the frames in the video that correspond to the point in time where the contrast agent is the densest inside the target organ. There are three common ways to use this data for registration: a) select a single frame where the contrast agent is the most visible; b) select the frame where the contrast agent is the most visible and subtract the previous frame; and c) select the frame where the contrast agent is the most visible (maximum contrast) and subtract the frame where no contrast agent is seen (minimum contrast). It was experimentally determined that using the last method of subtracting the maximum contrast frame with minimum contrast frames usually does not yield a good registration result when the minimum contrast frame was the very first frame of the sequence (known as frame 0). It seemed like the average intensity varied during the sequence acquisition. The best result was usually obtained by subtracting the maximum contrast frame with minimum contrast frames when the minimum contrast frame was the frame just before the appearance of the contrast agent.

In order to verify that selecting and subtracting two frames improved the registration result, a registration with a known solution at $(T_x, T_y)=(0,0)$ was solved using the three common ways identified above. The registration was solved using a global search optimizer that generates the cost function according to two parameters, in this case the parameters with a known solution: $(T_x, T_y)$. This allows checking if the registration has the minimum cost at the position where the mesh is registered as well as an idea of the "smoothness" of the cost function and the presence of local minima if any. The experiment clearly showed that only the last method of subtracting the maximum contrast frame with minimum contrast frames has a favorable cost function with the global minimum around the solution position. The results are similar for the plane "B" and when registering in biplane mode.

Figure 7:
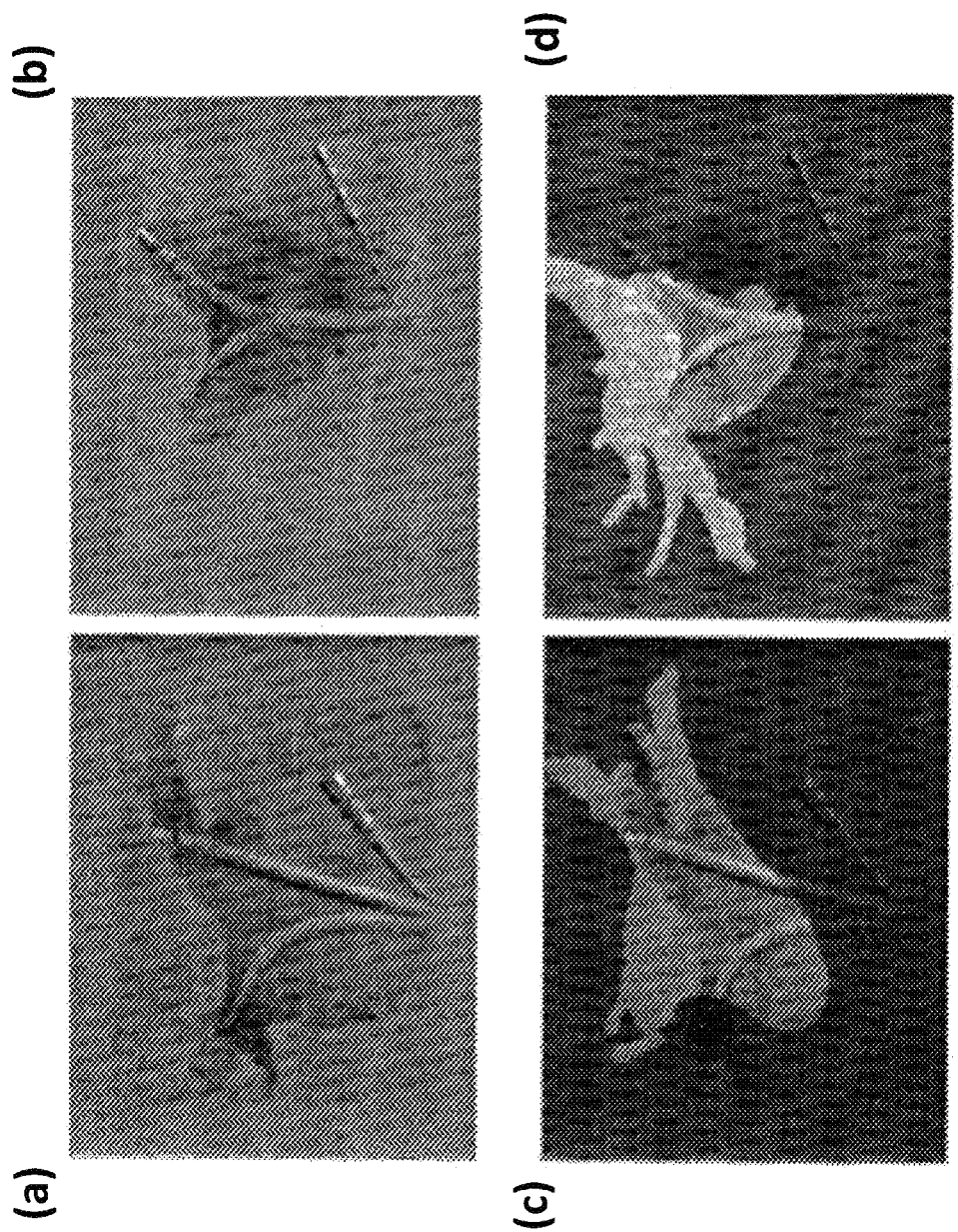
FIGS. 7a-7h are images of typical registration results performing the method of FIG. 2.
Figure 7:
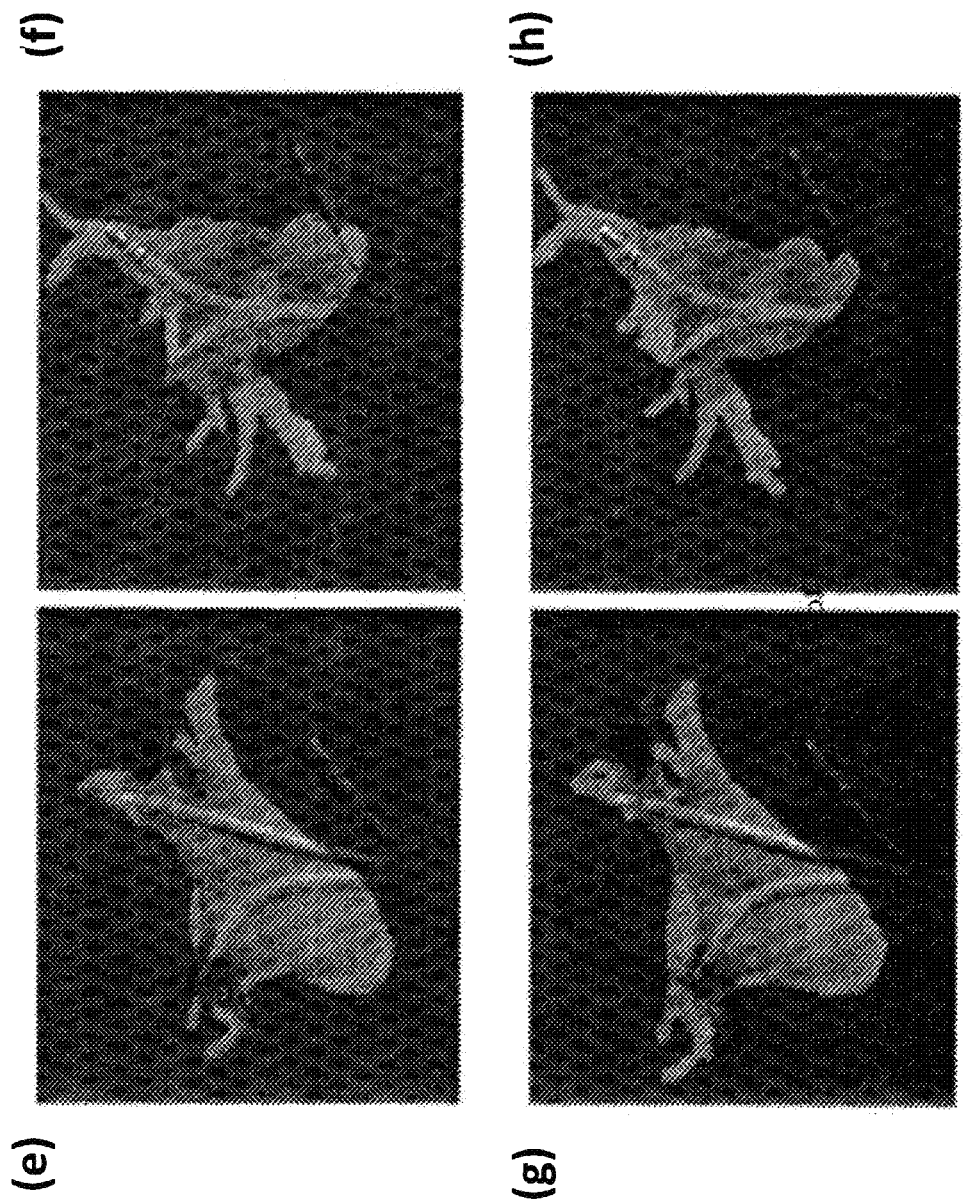

A typical strategy in image registration is to find the global minima of the cost function at a coarse resolution, and then refine the results at progressively higher resolutions. However, this strategy assumes, first, the global minimum is inside the convergence zone of the optimizator using the location of the minimum found at a coarse resolution as a starting point and, second, the sub-sampling the 2D images does not create additional local minima. This last assumption is discussed in more detail in an article by M. Jenkinson and S. Smith, entitled "A global optimisation method for robust affine registration of brain images," Medical Image Analysis, 2001, pp. 143-156, Vol. 5, No. 2. The following describes experiments that examined the behavior of the method 100 at multiple levels of sub-sampling and, specifically, viewing the transformation space at different rescaling factors. The method 100 was specifically performed for the transformation pixel spaces of 1024×1024 (i.e. no resizing), 256×256, 128×128, 64×64, 32×32, and 16×16. The registration results were analyzed by looking at the difference between "gold standard" parameters $\{T_x, T_y, T_z, R_x, R_y, R\}_{gold}$ and "registration" parameters $\{T_x, T_y, T_z, R_x, R_y, R_z\}_{reg}$, where T represents translation parameters and R represents rotation parameters. The registration time was evaluated on a 4 core Intel® Xeon® CPU W3530 2.80 GHz with a NVIDIA Quadro 600 graphics card. The experiments showed that resizing the source 2D fluoro images does not result in a registration precision penalty down to a scale of 64×64 pixels (average T from 1210 to 12.69 and average R from 2953 to 25.80 and that the penalty for scaling down to 32×32 pixels may be insignificant. The experiments also showed the registration completes much faster when resizing down to 128×128 pixels (from 162.9 sec to 15.3 sec). Resizing to a smaller size does not improve speed performance significantly, which is due to the fact that the source image processing and mesh processing times do not change with the size of the source 2D fluoro images. It was noted that since the experiments' units were in the mesh-transform reference system, the resizing does induce a factor-change in the error measurement, which renders possible the comparison between the different image sizes FIGS. 7a-7h show typical registration results performing the method 100. FIGS. 7a and 7b, like FIG. 1a, shows a real-time 2D image (fluoro image) with two electrode catheters and a lasso catheter inserted into the heart of a patient along Planes A and B, respectively. FIGS. 7c and 7d show initial positions of the 3D meshes that are randomly, manually corrupted along Planes A and B, respectively. The initial positions were picked to be relatively hard to register, with a heavy corruption in all 6 registration parameters (translation and rotation). The method 100 performed a global search in the translation parameters ($T_x$, $T_y$, $T_z$) to find a starting position, then a new registration was done using this new starting position and the Amoeba optimizer. FIGS. 7e and 7f show the registration results along the Planes A and B, respectively. FIGS. 7g and 7h show the "gold standard" registration results along the Planes A and B, respectively. These registrations were all done using the "subtract maximum contrast with minimum contrast frames" pre-processing method described above.

Note that performing the method 100 often, although not always, obtained favorable registration results, like those shown in FIGS. 7a-7h. Preliminary tests showed however that the method 100 registered biplane sequences of contrast-enhanced images with a reasonable error in the initial position. This was determined by using the target registration error (TRE) which is the average error over a set of predefined points when registered using the $M_{gold}$ and $M_{reg}$ matrices, according to the following:

$$TRE(P, M_{reg}, M_{gold}) = \frac{1}{k}\sum_{i=1}^{k}\|M_{reg}P_i - M_{gold}P_i\|,$$

where P is the set of predefined points over a region of interest (this is described in an article by E. van de Kraats, G. Penney, D. Tomazevic, T. van Walsum, and W. Niessen, entitled "Standardized evaluation methodology for 2-d-3-d registration," Medical Imaging, IEEE Transactions, September 2005, pp. 1177-1189, Vo. 24, which is incorporated by reference herein). In the case of mesh registration, the TRE can be calculated by using all the mesh vertices for P. Error measurements were made on the registration results of images resized to 256×256 pixels with a "corruption" applied of [$T_x$, $T_y$, T, $R_x$, $R_y$]$_{corrupted}$ [15,15,15,10,10,10]. The registration algorithm consisted of chaining a Powell—"Translation Only" with a "PowellTranslation/Rotation" optimizer. The error measurements showed the expected 2D TRE error of the method 100 was about 10 millimeters (or 15 pixels). Preliminary tests also confirmed that the above result is valid for "random initial positions".

Figure 8:
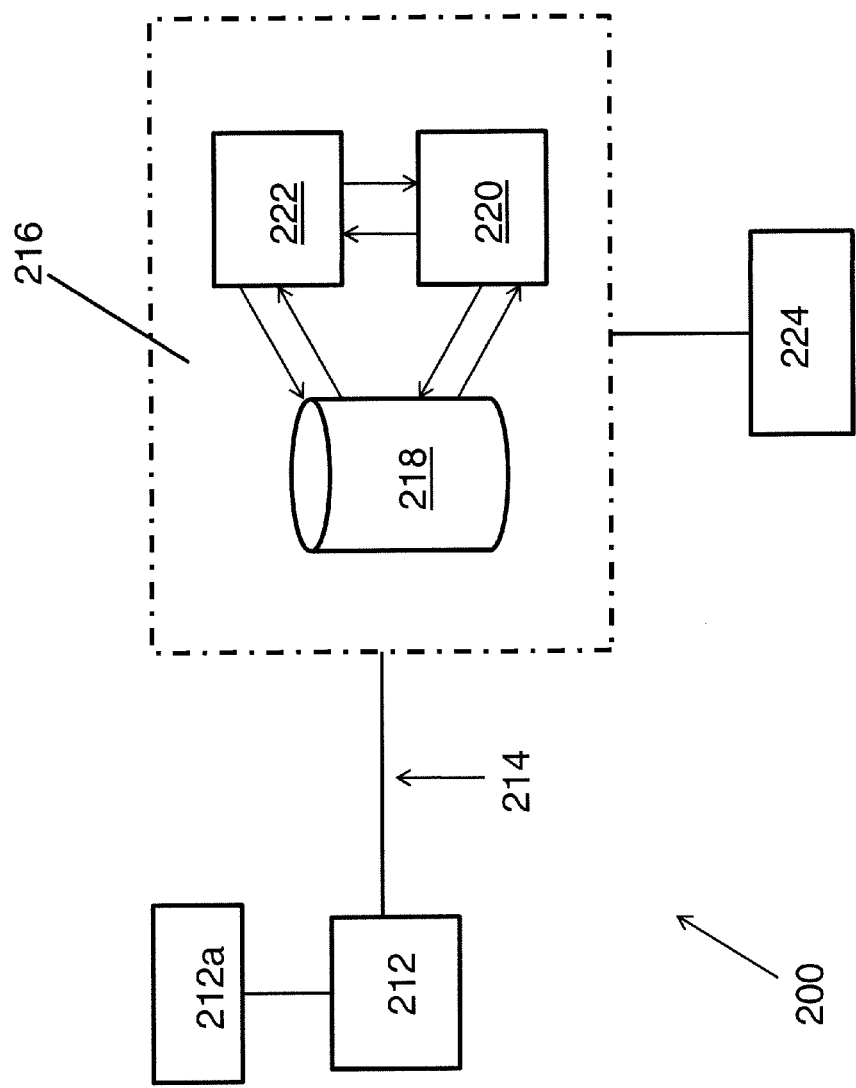
FIG. 8 is a block diagram of a medical imaging system (simplified) that may implement the method of FIG. 2.

FIG. 8 is a block diagram of a medical imaging system 200 (simplified) that may implement the method 100. The system 200 comprises a medical imaging scanner 212 that acquires image data of a patient under examination and, more particularly in this case, the heart of the patent. The scanner 212 may use X-ray imaging (e.g. using fluoroscopy) or other appropriate imaging modality to acquire the image data. The scanner 212 may acquire raw image data from multiple scanned views of the region of interest of the patient, record or reconstruct the images, and produce image data signals for the multiple views. This may be done in real-time or near real-time. The image data signals may be in Digital Imaging and Communications in Medicine (DICOM) format. Other formats may also be used.

The imaging scanner 212 is operably connected to a computer system 212a that controls the operation of the scanner 212 and, via a communication channel 214, to an image processing system 216 that processes the image data signals utilizing appropriate image processing software applications. The image processing system 216 has an image data archive or database 218, an application server 220, and a user workstation 222. The components of the image processing system 216 are interconnected via a communications network that may be implemented by physical connections, wireless communications, or a combination. The image data archive or database 218 is adapted to store the image data signals that are produced by the image scanner 212 as well as the results of any additional operations on the image data signals by the other components of the image processing system 216. The image data archive or database 218 is also adapted to store pre-acquired or pre-operative volumetric imaging data (obtained via any appropriate imaging modality) or 3D models of the anatomy or region of interest. The image data archive or database 218 may be a Picture Archiving and Communications System (PACS). Other types of image data archives or databases may also be used.

The user workstation 222 is adapted to control the operation of the imaging processing system 216 and its various components. The user workstation 222 particularly operates the application server 220 and the various image processing software applications that are stored in, or are accessible by, the server 220. The application server 220 also manages and coordinates the image data sets among the image processing applications. The image processing applications may include, for example, visualization applications, computer-aided diagnosis (CAD) applications, medical image rendering applications, anatomical segmentation applications, image registration applications, or any other type of medical image processing application. The image processing applications may also include the method 100 and those of its various steps. The image data archive or database 218, applications server 220, and the user workstation 222 may also each be connected to a remote computer network 224 for communication purposes or to access additional data or functionality. The workstation 222 may comprise appropriate user interfaces, like displays, storage media, input/output devices, etc.

The various components of the imaging system 200 are conventional and well known components. They may be configured and interconnected in various ways as necessary or as desired. The imaging system 200 and, in particular, the image processing system 216 is adapted to permit the imaging system 200 to operate and to implement methods in accordance with embodiments of the present invention, for example, as shown in FIG. 2.

Advantageously, the method 100 may provide for a real-time registration of multi-modal 3D data with mono and bi-plane fluoro images using pre-segmented masks. Further, the method 100 may use masks obtained from the 3D volumes to quickly register the mono or bi-plane images using an application of a cost function previously only used for segmentation. Thus, real-time feedback and overlay mappings may be provided during a medical procedure.

Other modifications are possible within the scope of the invention. For example, the subject patient to be scanned may be a human subject, animal subject or any other suitable object. Also, the pre-acquired volumetric imaging data may be a 3D model of the anatomical region of interest. Also, the present invention may be used for other heart-related procedures and medical interventional applications involving fluoro images or having a need for 2D/3D registration, besides the cardiac EP domain, as well as for non-medical applications.

Also, although the steps of the method 100 have been described in a specific sequence, the order of the steps may be re-ordered in part or in whole and the steps may be modified, supplemented, or omitted as appropriate. Also, the method 100 may use various well known algorithms and software applications to implement the steps and substeps, for example, the computation and rendering of the 2D mask. Further, the method 100 may be implemented in a variety of algorithms and software applications. Further, the method 100 may be supplemented by additional steps or techniques. It is also understood that the method 100 may carry out all or any of the steps using real-time data, stored data from a data archive or database, data from a remote computer network, or a mix of data sources.

Also, the various described instrumentation and tools may be configured and interconnected in various ways as necessary or as desired. Further, although in the described method 100 the user may use self-contained instrumentation and tools, the user may use other instrumentation or tools in combination with or in place of the instrumentation and tools described for any step or all the steps of the method 100, including those that may be made available via telecommunication means. Further, the described method 100, or any steps, may be carried out automatically by appropriate instrumentation and tools or with some manual intervention.

The invention claimed is:

1. A method of registering a 2D image of an object to a 3D image of the object, comprising
   forming a 3D mesh of the object from the 3D image,
   translating the 3D image or the 3D mesh into a counterpart 2D image, and
   spatially aligning the 3D mesh with the 2D image using the counterpart 2D image, including applying a cost function to evaluate and optimize a Chan-Vese-like functional used as an image dissimilarity metric.

2. The method of claim 1, wherein the translating step comprises projecting the 3D mesh into two dimensions to obtain a 2D mask.

3. The method of claim 1, wherein the spatially aligning step comprises optimizing a pose of the 3D mesh within the 2D image using the counterpart 2D image.

4. The method of claim 1, wherein the translating and spatially aligning steps are iteratively performed so that an alignment distance between the 2D image and the 3D mesh reaches a predetermined amount.

5. The method of claim 1, the spatially aligning step further comprises minimizing the image dissimilarity metric using a Downhill Simplex optimization method.

6. The method of claim 1, further comprising obtaining a plurality of image frames for the 2D image and determining the optimal image frame for an initial spatial alignment of the 3D mesh with the 2D image.

7. A method of visualizing an object relative to an anatomical region of interest of a patient during a medical procedure, comprising:
   a. obtaining an intra-operative 2D image of the anatomical region of interest;
   b. obtaining volumetric imaging data of the anatomical region of interest;
   c. obtaining a 3D mesh of the volumetric imaging data;
   d. obtaining an estimated pose of the anatomical region of interest from the 3D mesh;
   e. optimizing the estimated pose of the 3D mesh within the intra-operative 2D image to register the 3D mesh with the intra-operative 2D image and to localize the object relative to the anatomical region of interest;
   f. obtaining a plurality of image frames for the intra-operative 2D image; and
   g. detecting changes in the average intensity of the image in the plurality of image frames to determine an optimal image frame for an initial alignment of the 3D mesh with the intra-operative 2D image.

8. The method of claim 7, wherein obtaining volumetric imaging data comprises acquiring 3D images of the anatomical region of interest using either CT or MR imaging.

9. The method of claim 7, wherein obtaining a 3D mesh comprises segmenting the volume of the anatomical region of interest.

10. The method of claim 7, wherein obtaining an estimated pose comprises computing and rendering a 2D mask from the 3D mesh.

11. The method of claim 10, wherein the optimizing step comprises updating the estimated pose of the 3D mesh within the intra-operative 2D image using the 2D mask.

12. The method of claim 11, wherein the optimizing step comprises calculating the distance between the intra-operative 2D image and the 2D mask.

13. The method of claim 11, wherein the optimizing step comprises applying a cost function to evaluate and optimize a Chan-Vese-like functional used as an image dissimilarity metric.

14. The method of claim 13, the optimizing step comprises minimizing the image dissimilarity metric using a Downhill Simplex optimization method.

15. The method of claim 11, wherein the optimizing step comprises applying a cost function to evaluate and optimize an image dissimilarity metric that has the form of:

$$F = \left[ \int_{x \in \Omega(P(V))} \left( I(x) - \frac{1}{\int_{y \in \Omega(P(V))} 1 \cdot dy} \int_{y \in \Omega(P(V))} I(y) dy \right)^2 dx \right] + \left[ \int_{x \notin \Omega(P(V))} \left( I(x) - \frac{1}{\int_{y \notin \Omega(P(V))} 1 \cdot dy} \int_{y \notin \Omega(P(V))} I(y) dy \right)^2 dx \right],$$

where I is a respective intra-operative 2D image, specifies the non-zero region in the intra-operative 2D image, P is the re-projection operator/DRR generator for the 2D mask, and V is the volume of the anatomical region of interest in the respective volumetric imaging data.

16. The method of claim 15, the optimizing step comprises minimizing the image dissimilarity metric using a Downhill Simplex optimization method.

17. The method of claim 11, wherein the obtaining an estimated pose and the optimizing step are iteratively performed so that an alignment distance between the intra-operative 2D image and the 2D mask reaches a predetermined amount.

18. The method of claim 7, wherein obtaining an estimated pose comprises projecting the 3D mesh so as to render the 3D mesh in two dimensions.

19. The method of claim 18, wherein projecting comprises applying a geometric transform on the 3D mesh.

20. The method of claim 18, wherein the optimizing step comprises comparing the positional difference between the rendering of the projection of the 3D mesh and the intra-operative 2D image, which are overlaid one another.

21. The method of claim 20, wherein comparing comprises applying a cost function to evaluate and optimize an image dissimilarity measure for finding a pose that registers the 3D mesh with the 2D image.

22. The method of claim 7, further comprising
obtaining a plurality of image frames for the intra-operative 2D image and
determining an optimal image frame for an initial alignment of the 3D mesh with the intra-operative 2D image.

23. The method of claim 7, wherein obtaining an intra-operative 2D image of the anatomical region of interest comprises obtaining an intra-operative 2D image of the anatomical region of interest that is enhanced by an imaging contrast agent received by the patient.

24. A system for providing multi-modal 2D/3D image registration during a medical procedure, comprising
an imager that acquires 2D image data of an anatomical region of a patient and
a processor that manipulates the acquired image data and stored 3D image data of the anatomical region to align a stored 3D image to a 2D image and to automatically track the anatomical region position during the medical procedure,
said processor manipulating the 3D image data, in part, to render the stored 3D image in two dimensions for a positional comparison between the 3D image and the 2D image,
wherein the processor applies a cost function to evaluate and optimize a Chan-Vese-like functional used as an image dissimilarity metric and an optimization method to minimize the image dissimilarity metric.

25. The system of claim 24, wherein said processor has a graphics processing element that accelerates the manipulation of the 3D image data to render the stored 3D image in two dimensions.

* * * * *